United States Patent [19]

Seko et al.

[11] 4,093,568

[45] June 6, 1978

[54] PROCESS FOR PRODUCTION OF PERFLUOROCARBON TYPE CATION EXCHANGE MEMBRANE

[75] Inventors: Maomi Seko; Yasumichi Yamakoshi, both of Tokyo; Hirotsugu Miyauchi, Kawasaki; Mitsunobu Fukumoto, Yokohama; Kyoji Kimoto, Yokohama; Itaru Watanabe, Yokohama; Shigeo Yokoyama, Yokohama, all of Japan

[73] Assignee: Asahi Kasei Kogyo Kabushiki Kaisha, Osaka, Japan

[21] Appl. No.: 738,223

[22] Filed: Nov. 2, 1976

[30] Foreign Application Priority Data

Nov. 17, 1975 Japan .................. 50-137228

[51] Int. Cl.$^2$ .................. C25B 13/00; C25C 7/04
[52] U.S. Cl. .................. 260/2.2 R; 260/79.3 M
[58] Field of Search .......... 260/2.1 R, 2.2 R, 79.3 M; 204/159.22; 526/57, 248, 46, 23, 26, 42

[56] References Cited

U.S. PATENT DOCUMENTS

| | | | |
|---|---|---|---|
| 3,586,644 | 6/1971 | Jan de Jong | 260/2.2 R |
| 3,647,086 | 3/1972 | Mizutani et al. | 260/2.2 R |
| 3,684,747 | 8/1972 | Coalson | 260/2.2 R |
| 3,784,399 | 1/1974 | Grot | 260/2.2 R |
| 3,985,501 | 10/1976 | Grot | 260/2.2 R |

*Primary Examiner*—Joseph L. Schofer
*Assistant Examiner*—Peter Kulkosky
*Attorney, Agent, or Firm*—Cooper, Dunham, Clark, Griffin & Moran

[57] ABSTRACT

A perfluorocarbon type cation exchange membrane prepared by treatment with an oxidizing agent of a cation exchange membrane containing perfluorocarbon polymers having specific pendant N-sulfonamide groups has improved electrochemical characteristics when used as a membrane in electrolysis of aqueous alkali halide solution.

12 Claims, No Drawings

PROCESS FOR PRODUCTION OF PERFLUOROCARBON TYPE CATION EXCHANGE MEMBRANE

This invention relates to a process for producing improved perfluorocarbon type cation exchange membranes. More particularly, this invention relates to a process for producing fluorocarbon type cation exchange membranes, which comprises subjecting a cation exchange membrane containing perfluorocabon polymers having pendant N-sulfonamide groups as represented by the formulas (I) and/or (II):

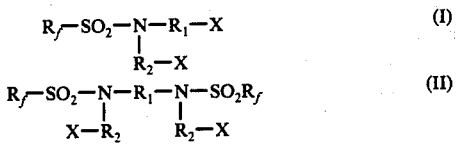

wherein $R_f$ represents a perfluorocarbon polymer chain, $R_1$ represents $-C_mH_{2m}-$ (where m is an integer of 1 to 6) or

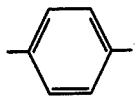

$R_2$ represents $-C_nH_{2n}-$ (where n is an integer of 0 to 6) and X represents hydrogen, amino group or hydroxyl group, to treatment with an oxidizing agent.

It has heretofore been known to utilize cation exchange membranes of perfluorocarbon polymers having pendant sulfonic acid groups obtained by hydrolysis of membranes formed from polymers comprising tetrafluoroethylene and perfluoro-3,6-dioxa-4-methyl-7-octene sulfonylfluoride in the electrolysis of aqueous alkali metal halides. These conventional cation exchange membranes containing only sulfonic acid groups are deficient because of low current efficiency during electrolysis. This is because sulfonic acid groups are highly hydrophilic so that hydroxyl ions back migrating from the cathode chamber easily permeate the membranes. In particular, when electrolysis of an aqueous sodium chloride solution is carried out while recovering a caustic soda solution with a high concentration, for example, 20% or more, current efficiency is extremely low. This is a significant economic disadvantage compared with conventional processes for electrolysis of aqueous sodium chloride solutions such as the mercury process of the diaphragm process.

For improvement of the low current efficiency as mentioned above, there have been proposed several methods. One of them is to decrease the exchange capacity of sulfonic acid groups to 0.7 milliequivalents or less per one gram of H-type dry resin, whereby water content in the membrane is reduced to increase, relatively, the ion concentration fixed in the membrane compared with the membranes with high exchange capacity. Due to these effects, lowering of current efficiency at the time of electrolysis can be somewhat alleviated. For example, when caustic soda with concentration of 20% is recovered during electrolysis of an aqueous sodium chloride solution, current efficiency can be improved up to about 80%. However, improvement of current efficiency by decrease of exchange capacity results in such a large increase in electric resistance of the membrane as to be a serious economic problem. Furthermore, no matter how much the exchange capacity of the membrane is reduced, it is very difficult to produce perfluoro-sulfonic acid type cation exchange membranes which are improved in current efficiency to as high as 90%.

U.S. Pat. No. 3,784,399 discloses another method for improvement of current efficiency by providing perfluorocarbon type cation exchange membranes having sulfonic acid groups in which the pendant groups on the side facing the cathode are converted into $-SO_2NH_2$ groups. When electrolysis of aqueous sodium chloride solution is carried out while recovering 20% caustic soda, current efficiency is about 82%. According to the process of U.S. Pat. No. 3,784,399, pendant sulfonyl fluoride groups in the perfluorocarbon polymer are allowed to react with ammonia only on one of the membrane surfaces for conversion into $-SO_2NH_2$ groups. In this process, the reaction between the pendant sulfonyl fluoride groups and ammonia is very slow, and treatment of one surface may require up to ten hours. In addition, complete conversion of sulfonyl fluoride groups into $-SO_2NH_2$ groups on the treated surface is generally difficult so that significant improvement of current efficiency is difficult.

It has been observed that the reaction between the pendant sulfonyl fluoride groups in perfluorocarbon polymers and ammonia does not proceed in successive stages from the surface to the internal portion of the membrane. Instead, the ammonia penetrates into the internal portion of the membrane while leaving a part of sulfonyl fluoride groups on the surface unreacted and reacts with sulfonyl fluoride groups present in the internal portion of the membrane. This is perhaps due to the fact that ammonia is a very small molecule and therefore the rate of diffusion of ammonia into the perfluorocarbon type polymer having pendant sulfonyl fluoride groups is greater than the reaction rate between ammonia and sulfonyl fluoride groups. Accordingly, for the surface of the membrane to become concentrated in $-SO_2NH_2$ groups, it is necessary to perform the reaction with ammonia over a long period of time with the result that the stratum of $-SO_2NH_2$ groups thickens. This causes an increase in electric resistance and cost of operations. It is difficult to convert a high proportion of the pendant groups of one surface of a cation exchange membrane while maintaining only a thin stratum of $-SO_2NH_2$ groups.

DAS 2437395 and DAS 2447540 also disclose a method for improvement of current efficiency by converting pendant groups on only the surface facing the cathode side of perfluorocarbon type cation exchange membrane having sulfonic acid groups into N-alkyl-N-sulfonamide groups. By this method, the deficiencies of the products of U.S. Pat. No. 3,784,399 as described above can be minimized so that cation exchange membranes of high current efficiency and low electric resistance can be produced. But use of amines introduces the problem of chemical instability due to poor resistance to oxidation during electrolysis. In fact, the cation exchange membranes produced by these methods show a current efficiency of approximately 90% in the initial stage of electrolysis of aqueous sodium chloride solution under the conditions mentioned above, but the current efficiency gradually decreases with use. For example, after continuous running, for about 200 hours, current efficiency may decrease to as low as 75%. Thus, according to the two methods as described above, it is difficult to produce cation exchange membranes which can be provided for use in production of highly concentrated caustic soda at high temperature and high current density with high current efficiency and low electric resistance as well as durability over a long period.

This invention provides perfluorocarbon type cation exchange membranes which are excellent in current efficiency and durable over prolonged periods.

According to the present invention, there is provided a process for producing a fluorocarbon type cation exchange membrane, which comprises subjecting a cation exchange membrane containing perfluorocarbon polymers having pendant N-sulfonamide groups as represented by the general formulas (I) and/or (II) to treatment with an oxidizing agent.

To explain in more detail, the starting materials of the present invention, namely cation exchange membranes containing perfluorocarbon polymers having pendant N-sulfonamide groups as represented by the general formulas (I) and/or (II), are obtained by allowing membranes of perfluorocarbon polymers having pendant sulfonylfluoride groups to react with primary amine and/or secondary amine and/or polyamine and then hydrolyzing the reaction product. The perfluorocarbon type polymers used for this invention containing pendant sulfonylfluoride groups comprise two class of monomers, each being at least one selected from the two groups shown below, respectively. One of the groups consists of fluorinated vinyl compounds such as tetrafluoroethylene, hexafluoropropylene, perfluoro (alkylvinyl ether) and mixtures thereof. The second groups consists of monomers containing sulfonylfluoride groups. One example of such monomers containing sulfonylfluoride groups is represented by the formula $CF_2=CFSO_2F$ and another by the formula $CF_2CF-R-SO_2F$ (wherein R represents a bi-functional perfluoro group containing 2 to 8 carbon atoms). R in said sulfonylfluoride group containing monomer is preferably

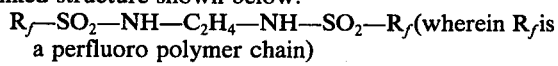

wherein n is preferably 1 or 2. The most suitable copolymer commmposition comprises from 40 to 75% of fluorinated vinyl compounds and from 60 to 25 mol% of perfluorovinyl compounds containing sulfonylfluoride groups.

The copolymers used for the present invention can be prepared by conventional polymerization methods known in the art for homo- or copolymerization of fluorinated ethylene. After polymerization, the polymers are fabricated into thin membranes according to conventionally known techniques such as molten fabrication.

The thus produced membranes of the perfluorocarbon polymers containing pendant sulfonylfluoride groups are allowed to react with primary amine and/or secondary amine and/or polyamide, whereby N-sulfonamide groups represented by the formulas (I) and/or (II) are readily formed. A wide variety of amines can be used for the reaction. These include, for example, primary amines such as methyl amine, ethyl amine, propyl amine, butyl amine, hexyl amine and aniline, and secondary amines such as dimethyl amine, diethyl amine, methyl ethyl amine, dipropyl amine and dibutyl amine. Furthermore, polyamines such as ethylene diamine, diethylene triamine, hexamethylene diamine, p-phenylene diamine and m-phenylene diamine can be used. Among the amines set forth above, alkyl amines having 1 to 8 carbon atoms and diamines of the formula $H_2N(CH_2)_nNH_2$ (wherein n is an interger of 2 to 10) are preferred. In particular, methyl amine, ethyl amine, n-butyl amine, diethyl amine, dibutyl amine, ethylene diamine, hexamethylene diamine and diethylene triamine are preferred.

The reaction between sulfonylfluoride groups and amines is preferably conducted under substantially anhydrous conditions. Amines can be used in either gaseous or liquid state or may be dissolved in inert solvents. The reaction conditions may be varied widely. It is usually convenient to carry out the reaction at ambient temperature under atmospheric pressure. When polyamines such as ethylene diamine or diethylene triamine are used, the N-sulfonamide groups may have the crosslinked structure shown below:

$R_f$—$SO_2$—NH—$C_2H_4$—NH—$SO_2$—$R_f$ (wherein $R_f$ is a perfluoro polymer chain)

When amines are to react with only one surface of the membrane, the membrane can be formed into a bag and only the inner or outer surface contacted with amines to carry out the reaction.

In the present invention, the perfluorocarbon type cation exchange membranes having sulfonic acid groups is modified to have N-sulfonamide groups preferably at only one surface facing the cathode side in the manner mentioned above. The thickness of the stratum of the N-sulfonamide groups and the proportion of the N-sulfonamide groups to the total ion exchange groups present on the surface are found to affect the characteristics of the cation exchange membranes of the present invention as described above. Therefore the process for conversion into N-sulfonamide groups is very important.

The thickness of the stratum of the N-sulfonamide groups shold be 0.2 μ or more, but there is a preferred upper limit since electric resistance is increased when the stratum is too thick. Accordingly, the thickness is preferred to be from 0.2 μ to 200 μ, especially from 2 μ to 50 μ.

The proportion of the N-sulfonamide groups to the total ion exchange groups present on the surface is preferably 90% or more, particularly 95% or more. Such a proportion can easily be achieved by conducting the reaction between sulfonylfluoride groups and amines under substantially anhydrous conditions.

After the reaction with amines, the membranes of the present invention can be provided with mechanical reinforcing backings such as nets for the purpose of increasing the mechanical strength of the membrane. Nets made of polytetrafluoroethylene fibers are most suitable. Other materials such as porous polytetrafluoroethylene sheets ae also useful for this purpose.

The membranes thus produced, having N-sulfonamide groups as presented by the formulas (I) and/or (II) on the side facing the cathode and sulfonylfluoride groups on the other side, are then subjected to hydrolysis to convert sulfonylfluoride groups into sulfonic acid groups and thereafter to treatment with an oxidizing agent to produce the fluorocarbon type cation exchange membrane of the present invention.

The oxidizing agents may include many of those conventionally used. For example, use can be made of metal perioxide type oxidizing agents exemplified typically by permanganates such as potassium permanganate or sodium permanganate and chromates such as potassium chromate or sodium dichromate; halogenic acid type oxidizing agents such as sodium perchlorate, sodium chlorate, potassium chlorite, sodium hypochlorite and sodium bromate; and other oxidizing agents such as hydrogen peroxide. Among these oxidizing agents, hydrogen peroxide and alkali metal salts of halogenic acids, especially sodium hypochlorite, are most preferred in handling.

When cation exchange membranes having the N-sulfonamide groups represented by the formulas (I) and/or (II) on one surface are to react with the oxidizing agent, an aqueous solution of the oxidizing agent is contacted with the membranes.

Among the conditions for treatment with an oxidizing agent to be used in the present invention, the oxidizing power is a very important factor. When treatment with an oxidizing agent is carried out under too powerful oxidizing conditions, the perfluorocarbon type cation exchange membranes deteriorate with loss of strength, or sulfonic acid groups are produced as byproducts. For example, treatment with an aqueous 30% hydrogen peroxide solution for a long period will cause such a great loss in strength of the membrane that it is no longer useful. However, when treatment with an oxidizing agent is carried out under oxidizing conditions which are too weak, the reaction proceeds very slowly.

The oxidizing power is generally represented by the oxidation potential E, adopting electromotive force (E.M.F.) of normal hydrogen electrode (N.H.E.) as standard. In the following explanation, chromates are used to illustrate the general phenomena.

$$HCrO_4^- + 7H^+ + 3e^- = Cr^{3+} + 4H_2O \qquad (1)$$

The oxidation potential is represented by the Nernst equation:

$$E = E_O - \frac{RT}{3F} \ln \frac{a_{Cr^{3+}}}{a_{HCrO_4^-} \, a_H^7} \qquad 2)$$

wherein $E_O$ denotes normal electrode potential based on N.H.E. and in the above reaction has a value of 1.35 volt at 25° C; R gas constant (8.314 joule K$^{-1}$ mol $^{-1}$); T absolute temperature (°K); F faraday constant (9.65 × 10$^4$ coul. mol$^{-1}$); $a_{Cr^{3+}}$, $a_{HCrO_4^-}$ and $a_H$ activities of Cr$^{3+}$, HCrO$_4^-$, and H$^+$, respectively.

The equation (2) is shown approximately as follows:

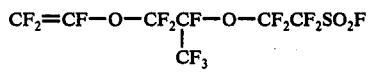

As will be seen from equation (3), the oxidation potential is dependent on the oxidizing agent employed, temperature, the pH, and the concentration of the oxidizing agent.

The conditions for treatment with an oxidizing agent according to the present invention cannot be expressed in general terms since the oxidation power is dependent on many factors such as the oxidizing agent employed, its concentration, the temperature, and the pH as described above. To set forth a desirable range, however, the oxidation potential as expressed by the above Nernst equation is preferably from 0.3 volt to 1.5 volt, especially from 0.5 volt to 1.2 volt.

The concentration of the oxidizing agent and the temperature for treatment with an oxidizing agent are important because they affect not only the oxidation potential as described above but also the reaction rate. Accordingly, they should be selected so that the oxidation potential is kept within the preferable range described above.

The concentration of the oxidizing agent is preferably from 0.1 milliequivalents/liter to 10 equivalents/liter. The treatment temperature is preferably from 5° to 100° C, preferably from 60° to 95° C.

When the cation exchange membranes containing perfluorocarbon polymers having pendant N-sulfonamide groups represented by the formulas (I) and/or (II) are allowed to stand in the air or assembled in an electrolyzer in contact with the oxidizing atmosphere of anode during electrolysis of aqueous alkali metal halide, they may undergo reaction similar to reaction with an oxidizing agent to some extent. In these cases, however, the reaction rate is too slow or unfavorable side reactions such as conversion of N-sulfonamide groups into sulfonic acid groups frequently occur, so that no improvement in high current efficiency can be obtained.

The fluorocarbon type cation exchange membranes according to the present invention, especially those of the preferred embodiments wherein the treatment of the present invention is applied only on the surface facing the cathode side, will effectively inhibit back migration of hydroxyl ions during electrolysis of aqueous alkali metal halide solution. There results high current efficiency, long-term durability and other advantages over the same type cation exchange membranes produced by other methods.

The present invention is illustrated in further detail by the following non-limiting examples.

EXAMPLE I

Tetrafluoroethylene and the compound $$CF_2=CF-O-CF_2CF-O-CF_2CF_2SO_2F$$
$$\qquad\qquad\qquad\quad |$$
$$\qquad\qquad\qquad\; CF_3$$

were polymerized according to a conventional method in the solvent Freon-113. The polymerized product was separated by filtration and then washed and dried under vacuum. A portion of the resulting polymer was hydrolyzed and subjected to measurement of exchange capacity by the titration method. The exchange capacity was found to be 0.83 milliequivalents/ gram-dry resin.

The copolymer was molded with heating to form a membrane of about 250 μ in thickness. The membrane was shaped in the form of a bag and a gas injecting pipe was inserted into the bag. Dry nitrogen gas was injected into the bag which was then evacuated. Then gaseous methyl amine under a pressure of about 1 atm. was introduced into the bag and allowed to react at room temperature for 15 minutes. After the reaction, the bag was first evacuated, and this was followed by introduction of nitrogen gas, and washing with water. The membrane was stained with 0.1% aqueous Malachite Green solution to a depth of about 15 μ. Analysis of the surface reacted with methyl amine by Attenuated Total Reflection Spectrum (hereinafter abbreviated as "A.T.R.") indicated that there was no specific absorption of —SO$_2$F at 1470 cm$^{-1}$ or of —SO$_3$H or —SO$_3^-$ at 1060 cm$^{-1}$, indicating that conversion of —SO$_2$F on the surface was substantially 100%. Then, the membrane was hydrolyzed in an aqueous solution containing 15% sodium hydroxide and 30% dimethylsulfoxide (hereinafter abbreviated as "DMSO").

The membrane thus prepared having on one surface the stratum having —SO$_2$NHCH$_3$ groups was placed in a 5-liter separating flask equipped with a reflux condenser and sufficient aqueous sodium hypochlorite solution containing 5% effective chlorine and 10% sodium hydroxide was added so that the membrane was completely covered with solution. Then, the flask was heated by means of a mantle heater until the inner temperature of the flask was 90° C. After 24 hours, the membrane was taken out of the flask, washed with water and with 1 N hydrochloric acid, followed by drying in air. It was then subjected to analysis by A.T.R. There was no specific absorption of —SO$_2$NHCH$_3$ appearing at near 2900 cm$^{-1}$, 1440 cm$^{-1}$, 1420 cm$^{-1}$ and 850 cm$^{-1}$ but new absorptions appeared at 1550 cm$^{-1}$ and 920 cm$^{-1}$. These absorptions at 1550 cm$^{-1}$ and 920 cm$^{-1}$ are estimated to be specific absorptions of —SO$_2$NH$_2$. There was no absorption of —SO$_3$H at 1060 cm$^{-1}$, either.

The thus produced membrane had a specific conductivity of 6.7 × 10$^{-3}$ mho/cm, when measured in 0.1 N sodium hydroxide solution. The specific conductivity of the membrane was determined by converting the membrane completely into the form of sodium salt, then immersing the membrane in 0.1 N sodium hydroxide solution at normal temperature for 10 hours thereby to equilibrate therewith while renewing the solution, and passing alternating current of 1000 cycles through the membrane in 0.1 N sodium hydroxide solution maintained at 25° C to measure the electric resistance of the membrane.

When the above membrane was immersed in 2.5 N sodium hydroxide solution at 90° C for 16 hours to be equilibrated therewith and thereafter assembled as membrane for electrolysis of sodium chloride with the reacted surface facing the cathode side, the current efficiency observed as 90° C on an average during a current passage interval from 0 to 50 hours. The average current efficiency over the current passage interval from 500 to 550 hours was found to be 89%, and that from 1000 1050 hours 89%. The current efficiency was determined by use of the following apparatus:

The electrolyzer consists of anode chamber and cathode chamber separated by an electrolysis membrane with current passage area of 625 cm$^2$ (25 cm × 25 cm). The anode is a dimensionally stable metal electrode and the cathode is iron. While circulating 3 N aqueous sodium chloride solution at pH 3 into the anode chamber and 20% sodium hydroxide solution into the cathode chamber at 90° C, a current was passed at a current density of 50 A/dm$^2$. The current efficiency is calculated by dividing the amount of sodium hydroxide formed in the cathode chamber per unit time by the theoretical amount calculated from the amount of current passed.

EXAMPLE 2

A membrane of a polymer containing pendant —SO$_2$F groups with thickness of 40 μ and exchange capacity of 0.86 milliequivalents/gram-dry resin was prepared as in Example 1. The membrane was dipped in saturated DMSO solution of methyl amine to carry out the reaction. After washing with 1N hydrochloric acid, the membrane was analyzed by Infrared Absorption Spectrum (hereinafter abbreviated as I.R.) to find that —SO$_2$F groups were almost completely converted into —SO$_2$NHCH$_3$ groups.

The membrane was treated using the same apparatus as in Example 1 with an aqueous sodium hypochlorite solution containing 1% effective chlorine and 10% sodium hydroxide at 80° C for 40 hours. After the treatment, the membrane was washed with water and then dipped in 1 N hydrochloric acid thoroughly to convert the membrane into the acid form. After drying in air, I.R. analysis of the membrane indicated that there were no specific absorptions of —SO$_2$NHCH$_3$, i.e. three absorptions at near 2900 cm$^{-1}$, absorptions at 1440 cm$^{-1}$, 1420 cm$^{-1}$ and 850 cm$^{-1}$, but only absorptions at 1550 cm$^{-1}$ and 920 cm$^{-1}$. From these results, it is clear that the reaction extended sufficiently into the internal portion of the membrane.

EXAMPLE 3

A membrane of a polymer containing pendant —SO$_2$F groups with thickness of 250 μ and exchange capacity of 0.83 milliequivalents/gram-dry resin was prepared similarly as in Example 1. The membrane was shaped into the form of a bag. After the inner portion of the bag was evacuated, the bag was dipped in anhydrous ethylene diamine. After 10 minutes, the bag was taken out, washed with water and then washed with dilute acetic acid, followed by three washings with water. When this bag was opened into membrane and a cut specimen of the membrane was stained with an aqueous Malachite Green solution, the specimen was stained to the depth of about 20 μ. The membrane was dried on air and then heated at 200° C for one hour, followed by hydrolysis in an aqueous solution containing 15% sodium hydroxide and 30% DMSO.

Using the same apparatus as in Example 1, this membrane was treated in an aqueous hypochlorite solution containing 1% effective chlorine and 5% sodium hydroxide at 60° C for 80 hours. When this membrane was analyzed by A.T.R., absorptions at 1550 cm$^{-1}$ and 920 cm$^{-1}$ were observed, as in Example 1.

Specific conductivity and current efficiency of this membrane were measured under the same conditions as in Example 1.

This membrane was found to have a specific conductivity of 5.8 × 10$^{-3}$ mho/cm.

The current efficiency of this membrane was measured over a long period. The average current efficiency over a current passage interval from 0 to 50 hours was 92%; that from 500 to 550 hours 90%; and that from 1000 to 1050 hours 90%.

EXAMPLES 4 and 5

A membrane of a polymer containing pendant —SO$_2$F groups with thickness of 250 μ and exchange capacity of 0.94 milliequivalents/gram-dry resin was prepared as in Example 1. This membrane was fabricated into two bags. These bags were contacted at room temperature for 10 minutes with diethyl amine and dibutyl amine, respectively. Then, each bag was washed thoroughly with water and dilute acetic acid and the bag was opened. Each membrane was hydrolyzed in an aqueous solution containing 15% potassium hydroxide and 50% DMSO. These membranes were treated in an aqueous solution at pH 3.5 containing 10% K$_2$CrO$_4$ and 4% Cr(NO$_3$)$_3$·9H$_2$O at 60° C for 10 hours. After the treatment, each membrane was washed well with 1 N hydrochloric acid and subjected to analysis by A.T.R. No absorption of N,N-dialkyl-N-sulfonamide was observed, but only new absorptions at 1550 cm$^{-1}$ and 920 cm$^{-1}$ were observed, as in Example 1. Each of these membranes exhibited high current efficiency.

EXAMPLES 6 and 7

A membrane of a polymer containing pendant —SO$_2$F groups with thickness of 250 μ and exchange capacity of 0.86 milliequivalents/gram-dry resin was prepared as in Example 1. This membrane was fabricated into two bags. The bags were contacted at room temperature for 20 hours with diethylene triamine and ethanol amine, respectively. Then, each bag was washed thoroughly with water and dilute acetic acid and opened. Each membrane was hydrolyzed in an aqueous solution containing 15% sodium hydroxide and 30% DMSO. The membranes were treated in an aqueous solution containing 1% hydrogen peroxide and 4% sodium hydroxide at 60° C for 24 hours. After washing well with 1 N hydrochloric acid, A.T.R. analysis of the membranes gave the result that only new absorptions at 1550 cm$^{-1}$ and 920 cm$^{-1}$ were observed.

Specific conductivity and current efficiency of these membranes were measured under the same conditions as in Example 1.

When diethylene triamine was used, the specific conductivity of the membrane was found to be 6.0 × 10$^{-3}$ mho/cm, and the average current efficiency over a current passage interval from 0 to 50 hours 90%, and that from 500 to 550 hours 90%.

When ethanol amine was used, specific conductivity of the membrane was found to be 6.1 × 10$^{-3}$ mho/cm, and the average current efficiency over current passage interval from 0 to 50 hours 89%, and that from 500 to 550 hours 89%.

COMPARISON EXAMPLE 1

A membrane of a polymer containing pendant —SO$_2$F groups with a thickness of 250 μ and an exchange capacity of 0.83 milliequivalents/gram-dry resin was prepared as in Example 1. This membrane was formed into a bag and the inner surface of the bag was treated with gaseous methyl amine to convert the surface —SO$_2$F groups to —SO$_2$NHCH$_3$ groups to a depth of 15 μ. This membrane was hydrolyzed in an aqueous solution containing 15% potassium hydroxide and 30% DMSO, followed by thorough wasing with water to extract DMSO. The resulting membrane was subjected to measurement of specific conductivity and current efficiency under the same conditions as in Example 1 without treatment with an oxidizing agent.

The membrane was found to have a specific conductivity of 6.1 × 10$^{-3}$ mho/cm.

When the current efficiency of this membrane was measured over a long term, it was found that the average current efficiency over a current passage interval from 0 to 50 hours was 91%, that from 200 to 250 hours 82%; that from 500 to 550 hours 78%; and that from 1000 to 1050 hours 76%.

COMPARISON EXAMPLE 2

A membrane of a polymer containing pendant —SO$_2$F groups with a thickness of 250 μ and an exchange capacity of 0.83 milliequivalents/gram-dry resin was treated with ethylene diamine in the same manner as in Example 3 to effect amidation to the depth of 25 μ from the surface. After the membrane was further heated at 200° C for one hour, it was hydrolyzed in an aqueous solution containing 15% potassium hydroxide and 30% DMSO, followed by thorough washing with water to extract DMSO.

This membrane, without treatment with an oxidizing agent, was subjected to measurement of specific conductivity and current efficiency under the same conditions as in Example 1. It was found to have a specific conductivity of 5.5 × 10$^{-3}$ mho/cm.

The average current efficiency over a current passage interval from 0 to 50 hours was 94%; that from 200 to 250 hours 76%; and that from 500 to 550 hours 73%.

COMPARISON EXAMPLE 3

A membrane of a polymer containing pendant —SO$_2$F groups with a thickness of 250 μ and an exchange capacity of 0.83 milliequivalents/gram-dry resin was prepared. This membrane was shaped into the form of a bag and then allowed to react with ammonia gas by inserting a pipe into the bag. First, nitrogen gas was passed into the bag and thereafter the bag was evacuated. Then, ammonia gas at about 1 atm. was introduced into the bag and only the inner surface of the bag was allowed to react with ammonia at 80° C for 10 hours. After the reaction, the ammonia gas was purged with nitrogen gas, followed by evacuation to completely remove ammonia. After the bag was opened, a cut specimen was stained with 0.1% aqueous Malachite Green solution. No distinct boundary between the stained and unstained strata was observed. When the surface which had reacted with ammonia was analyzed at A.T.R., there were absorptions of —SO$_2$F groups at 1470 cm$^{-1}$. The membrane was hydrolyzed in an aqueous solution containing 15% potassium hydroxide and 30% DMSO, followed by thorough washing with water to extract DMSO.

This membrane was subjected to measurement of specific conductivity and current efficiency under the same conditions as in Example 1. The specific conductivity was 6.1 × 10$^{-3}$ mho/cm.

The average current efficiency over a current passage interval from 0 to 50 hours was found to be 81%, that from 500 to 550 hours 80%; and that from 1000 to 1050 hours 80%.

What we claim is:

1. A process for producing a cation exchange membrane, which comprises subjecting a cation exchange membrane containing perfluorocarbon polymers having pendant N-sulfonamide groups as represented by the formulas (I) and (II):

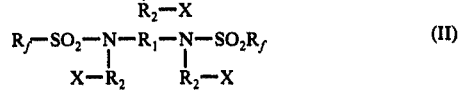

wherein R$_f$ represents a perfluorocarbon polymer chain, R$_1$ represents —C$_m$H$_{2m}$— (where m is an integer of 1 to 6) or

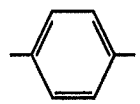

R$_2$ represents —C$_n$H$_{2n}$— (where n is an integer of 0 to 6) and X represents hydrogen, amino group or hydroxyl group, to treatment with an oxidizing agent under conditions such that the concentration of the oxidizing agent is from 0.1 milliequivalents/liter to 10 equivalents/liter, at a temperature of from 5° C to 100° C at an oxidation potential of from 0.3 to 1.5 volt; the said pendant sulfonamide groups being present in a surface stratum containing at least 90% of said groups based on the total cation exchange groups in said stratum, the thickness of said stratum being from 0.2 to 200 μ.

2. A process as in claim 1, wherein the perfluorocarbon polymer is a reaction product between (1) a copolymer of (a) one fluorinated vinyl compound with (b) at least one perfluorovinyl compounds having sulfonylfluoride groups and (2) at least one of primary amines, secondary amines and polyamines.

3. A process as in claim 2, wherein (a) is tetrafluoroethylene and (b) is $$CF_2=CF-O-CF_2-\underset{\underset{CF_3}{|}}{CF}-O-CF_2CF_2SO_2F.$$

4. A process as in claim 1 wherein the oxidizing agent is selected from the group consisting of metal peroxides, halogenic acid type oxidizing agents and hydrogen peroxide.

5. A process as in claim 1, wherein the treatment with an oxidizing agent is conducted under the conditions such that the oxidation potential as defined by the Nernst's equation in the specification is from 0.3 to 1.5 volt.

6. A process as in claim 1 wherein the oxidation potential is from 0.5 to 1.2 volt and the temperature is from 60° C to 95° C.

7. A cation exchange membrane produced by a process which comprises subjecting a cation exchange membrane containing perfluorocarbon polymers having pendant N-sulfonamide groups as represented by the formulas (I) and (II):

$$R_f-SO_2-\underset{\underset{R_2-X}{|}}{N}-R_1-X \quad (I)$$

$$R_f-SO_2-\underset{\underset{X-R_2}{|}}{N}-R_1-\underset{\underset{R_2-X}{|}}{N}-SO_2-R_f \quad (II)$$

wherein $R_f$ represents a perfluorocarbon polymer chain, $R_1$ represents $-C_mH_{2m}-$ (where $m$ is an integer of 1 to 6) or <img of para-phenylene>, $R_2$ represents $-C_nH_{2n}-$ (where $n$ is an integer of 0 to 6) and X represents hydrogen, amino group or hydroxyl group, to treatment with an oxidizing agent under conditions such that the concentration of the oxidizing agent is from 0.1 milliequivalents/liter to 10 equivalents/liter, at a temperature of from 5° C to 100° C at an oxidation potential of from 0.3 to 1.5 volt; the said pendant sulfonamide groups being present in a surface stratum containing at least 90% of said groups based on the total cation exchange groups in said stratum, the thickness of said stratum being from 0.2 to 200 μ.

8. A product produced by the process of claim 7 wherein the perfluorocarbon polymer is a reaction product between (1) a copolymer of (a) one fluorinated vinyl compound with (b) at least one perfluorovinyl compounds having sulfonylfluoride groups and (2) at least one of primary amines, secondary amines and polyamines.

9. A product produced by the process of claim 8 wherein (a) is tetrafluoroethylene and (b) is $$CF_2=CF-O-CF_2-\underset{\underset{CF_3}{|}}{CF}-O-CF_2CF_2SO_2F.$$

10. A product produced by the process of claim 7 wherein the oxidizing agent is selected from the group consisting of metal peroxides, halogenic acid type oxidizing agents and hydrogen peroxide.

11. A product produced by the process of claim 7 wherein the treatment with an oxidizing agent is conducted under the conditions such that the oxidation potential as defined by the Nernst's equation in the specification is from 0.3 to 1.5 volt.

12. A product produced by the process of claim 11 wherein the oxidation potential is from 0.5 to 1.2 volt and the temperature is from 60° C to 95° C.

* * * * *